(12) United States Patent
Kulkarni

(10) Patent No.: US 11,481,283 B2
(45) Date of Patent: Oct. 25, 2022

(54) SYSTEMS AND METHODS PROVIDING BACKUP DATABASE FOR PROTECTING MESSAGES ON A CAN BUS

(71) Applicants: HYUNDAI MOTOR COMPANY, Seoul (KR); KIA MOTORS CORPORATION, Seoul (KR)

(72) Inventor: Ashwin Kulkarni, Superior Township, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 231 days.

(21) Appl. No.: 16/774,339

(22) Filed: Jan. 28, 2020

(65) Prior Publication Data

US 2021/0232463 A1    Jul. 29, 2021

(51) Int. Cl.
*G06F 11/14* (2006.01)
*H04L 12/40* (2006.01)

(52) U.S. Cl.
CPC .......... *G06F 11/1464* (2013.01); *H04L 12/40* (2013.01); *G06F 2201/80* (2013.01); *H04L 2012/40215* (2013.01); *H04L 2012/40273* (2013.01)

(58) Field of Classification Search
CPC .. G06F 11/1464; G06F 2201/80; H04L 12/40; H04L 2012/40215; H04L 2012/40273
See application file for complete search history.

(56) References Cited

U.S. PATENT DOCUMENTS

| | | | |
|---|---|---|---|
| 2005/0251604 A1* | 11/2005 | Gerig | H04L 67/12 710/120 |
| 2008/0186870 A1* | 8/2008 | Butts | H04L 43/0847 370/252 |
| 2018/0152472 A1 | 5/2018 | Amano et al. | |
| 2018/0244238 A1 | 8/2018 | Shah et al. | |
| 2021/0306177 A1* | 9/2021 | Fredriksson | H04L 12/40013 |

FOREIGN PATENT DOCUMENTS

| | | |
|---|---|---|
| KR | 10-1549034 B1 | 8/2015 |
| KR | 10-1669946 B1 | 10/2016 |
| KR | 10-1705639 B1 | 2/2017 |
| KR | 10-1816582 B1 | 1/2018 |

OTHER PUBLICATIONS

Kyong-Tak Cho et al., Error Handling of In-vehicle Networks Makes Them Vulnerable, 12 pages.
Andy Greenberg, the Jeep Hackers Are Back to Prove Car Hacking Can Get Much Worse, found at https://www.wired.com/2016/08/jeep-hackers-return-high-speed-steering-acceleration-hacks/, (Aug. 1, 2016), 7 pages.

* cited by examiner

*Primary Examiner* — Diedra McQuitery
*Assistant Examiner* — Tony Wu
(74) *Attorney, Agent, or Firm* — Lempia Summerfield Katz LLC

(57) ABSTRACT

Systems and methods are disclosed for implementing enhanced security measures that include utilizing a backup database included on node devices connected to a CAN bus, so that certain message identifiers are updated according to a matching table stored on the backup database. By updating the message identifiers, outside attackers will not be privy to the new message identifier assigned to the messages and will no longer target such messages.

17 Claims, 5 Drawing Sheets

SYSTEMS AND METHODS PROVIDING BACKUP DATABASE FOR PROTECTING MESSAGES ON A CAN BUS

FIELD

Enhanced security measures are disclosed for working against unwanted intrusion from outside attackers into a controller area network (CAN) bus. The enhanced security measures utilize a backup database that may be included on node devices connected to a CAN bus, so that certain message identifiers are updated according to a matching table stored on the backup database. By updating the message identifiers, outside attackers will not be privy to the new message identifiers assigned to the messages and thus will no longer be able to target such messages.

BACKGROUND

The statements in this section merely provide background information related to the present disclosure and may not constitute prior art.

With the advancement in technologies that are being applied to vehicles, vehicles have become more reliant on communicating important data within its CAN bus. The data communicated within the CAN bus may be used for controlling vehicle features such as braking, cruise control, and airbag deployment. Therefore, implementing security measures on the CAN bus may aid a vehicle to prevent an outside intruder gaining access to the CAN bus and compromising data shared on the CAN bus which can lead to interference of the vehicle's operations.

SUMMARY

In one form of the present disclosure, a computing device includes: a message interface circuitry configured to: transmit a data message to a controller area network (CAN) bus, wherein the data message includes a message ID; and receive an error message from the CAN bus; a data storage unit configured to store a backup database, wherein the backup database includes a data table including a mapping of an original message identifier (ID) to a secret message identifier (ID); a processing circuitry configured to: detect the error message; increase an error counter based on the detected error message; retrieve a backup message ID table stored on the backup database; identify, from the backup message ID table, a backup message ID corresponding to the message ID; and transmit, through the message interface circuitry, an updated message on the CAN bus, wherein the updated message replaces the message ID with the backup message ID.

In another form, the backup message ID table includes a plurality of predetermined backup message IDs each corresponding to a different feature. In addition, the processing circuitry is further configured to: enter a bus-off state when the error counter is greater than a predetermined value, and periodically update the backup message ID table to change values of the backup message IDs. In one form, the predetermined value is approximately 255.

In other form of the present disclosure, a method comprises: transmitting, by a message interface circuitry, a data message to a controller area network (CAN) bus, wherein the data message includes a message ID; receiving, by the message interface circuitry, an error message from the CAN bus; detecting, by a processing circuitry, the error message; increasing, by the processing circuitry, an error counter based on the detected error message; retrieving, by the processing circuitry, a backup message ID table stored on a backup database; identifying, by the processing circuitry, a backup message ID corresponding to the message ID from the backup message ID table; and transmitting, through the message interface circuitry, an updated message on the CAN bus, wherein the updated message replaces the message ID with the backup message ID. In particular, the backup message ID table includes a plurality of predetermined backup message IDs each corresponding to a different feature.

In another form, the method may further include: entering, by the processing circuitry, a bus-off state when the error counter is greater than a predetermined value; and periodically updating, by the processing circuitry, the backup message ID table to change values of the backup message IDs.

In another aspect of the present disclosure, a computing device includes: a processing circuitry; and a non-transitory storage medium configured to store instructions that, when executed, causes the processing circuitry to: detect an error message; increase an error counter based on the detected error message; retrieve a backup message ID table stored on a backup database; identify, from the backup message ID table, a backup message ID corresponding to the message ID; and transmit, through a message interface circuitry, an updated message on a CAN bus, wherein the updated message replaces the message ID with the backup message ID.

In one form, the non-transitory storage medium is further configured to store instructions that, when executed, causes the processing circuitry to: enter a bus-off state when the error counter is greater than a predetermined value. In other form, the non-transitory storage medium is further configured to store instructions that, when executed, causes the processing circuitry to: periodically update the backup message ID table to change values of the backup message IDs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
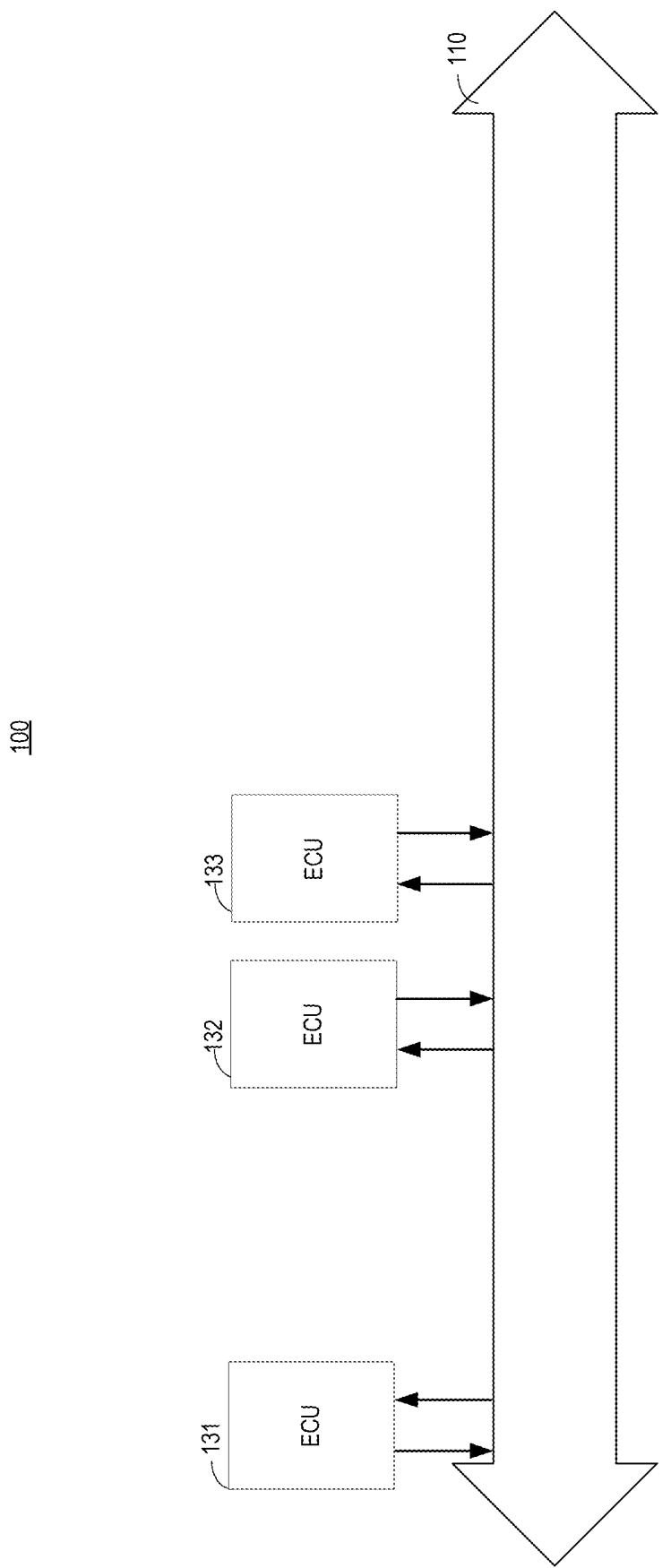
FIG. 1 shows an exemplary CAN bus system, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, applica- According to some forms, a computing device is disclosed that comprises a message interface circuitry configured to transmit a data message to a controller area network (CAN) bus, wherein the data message includes a message ID, and receive an error message from the CAN bus. The computing device may further comprise a data storage unit configured to store a backup database, wherein the backup database includes a data table including a mapping of an original message identifier (ID) to a secret message identifier (ID). The computing device may further comprise a processing circuitry configured to detect the error message, increase an error counter based on the detected error message, retrieve a backup message ID table stored on the backup database, identify, from the backup message ID table, a backup message ID corresponding to the message ID, and transmit, through the message interface circuitry, an updated message on the CAN bus, wherein the updated message replaces the message ID with the backup message ID.

According to some forms, a method is disclosed comprising transmitting, by a message interface circuitry, a data message to a controller area network (CAN) bus, wherein the data message includes a message ID, receiving, by the message interface circuitry, an error message from the CAN bus, detecting, by a processing circuitry, the error message, increasing, by the processing circuitry, an error counter based on the detected error message, retrieving, by the processing circuitry, a backup message ID table stored on a backup database, identify, by the processing circuitry, a backup message ID corresponding to the message ID from the backup message ID table, and transmitting, through the message interface circuitry, an updated message on the CAN bus, wherein the updated message replaces the message ID with the backup message ID.

According to some forms, a computing device is disclosed comprising a processing circuitry configured to, and a non-transitory storage medium configured to store instructions that, when executed, causes the processing circuitry to detect an error message, increase an error counter based on the detected error message, retrieve a backup message ID table stored on a backup database, identify, from the backup message ID table, a backup message ID corresponding to the message ID, and transmit, through a message interface circuitry, an updated message on a CAN bus, wherein the updated message replaces the message ID with the backup message ID.

The forms described herein relate to enhanced security measures applied to a controller area network (CAN) bus installed on a vehicle. While the CAN bus described herein is provided in the context of being installed on a vehicle, the security features described in this disclosure may be applied to CAN buses that are installed on other devices according to other forms, and are not necessarily limited to the vehicle forms.

A vehicle's CAN bus is used to communicate data to and from different engine control units (ECUs) that are coupled to the CAN bus, where the ECUs are utilized for controlling specific vehicle features. FIG. 1 illustrates an exemplary vehicle's CAN bus system 100 that includes a CAN bus 110, a first ECU 131, a second ECU 132, and a third ECU 133. An ECU on the CAN bus system 100 may be referred to as a node of the CAN bus system 100. More specifically, each ECU 131-132 shown in FIG. 1 is configured to control a dedicated vehicle feature such as vehicle speed control, airbag deployment control, cruise control, brake control, anti-theft systems control, traction control, and/or engine control. For exemplary purposes, the ECUs 131-132 may represent ECUs that control high value vehicle functions. For example, the first ECU 131 may be configured for vehicle speed control, the second ECU 132 may be configured for air bag deployment control, and the third ECU 133 may be configured for brake controls. One or more of the ECUs 131-133 may be programmable to modify its functionality based on information received through the CAN bus 110.

As shown in FIG. 1, information is communicated between the ECUs 131-133 on the CAN bus 110. When the first ECU 131 transmits a message on the CAN bus 110, the remaining ECUs that are coupled to the CAN bus 110 (e.g., the second ECU 132 and the third ECU 133) receive the message. The message may include a message identifier (ID) that identifies the intended recipient ECU of the transmitted message. According to exemplary forms, when a single ECU transmits a message on the CAN bus 110, the remaining ECUs will all receive the message. After successfully receiving the message via the CAN bus 110, one or more of the receiving ECU transmits a confirmation message back to the transmitting ECU via the CAN bus 110.

As a vehicle's technology improves and offers more high-tech features, the CAN bus system 100 is relied upon more often to communicate data amongst the different ECUs of the vehicle. With this increased reliance on the CAN bus system 100 to transmit data amongst the vehicle ECUs, there is a desire to improve security to protect the CAN bus system 100 from unwanted intrusions. For example, an unwanted third party may attempt to launch a man-in-the-middle type cyber security attack that intercepts messages on the CAN bus 110 and replaces them with corrupted messages intended to disrupt vehicle operations. To help prevent such unwanted intrusions, a security solution is disclosed for "hiding" messages intended for ECUs that control one or more predetermined vehicle features (e.g., high value vehicle features). The enhanced security measures work by mapping original message IDs to backup message IDs that are unknown to entities outside the CAN bus system 100. Further description of the message ID is provided with reference to the CAN bus system 100 illustrated in FIG. 2.

Figure 2:
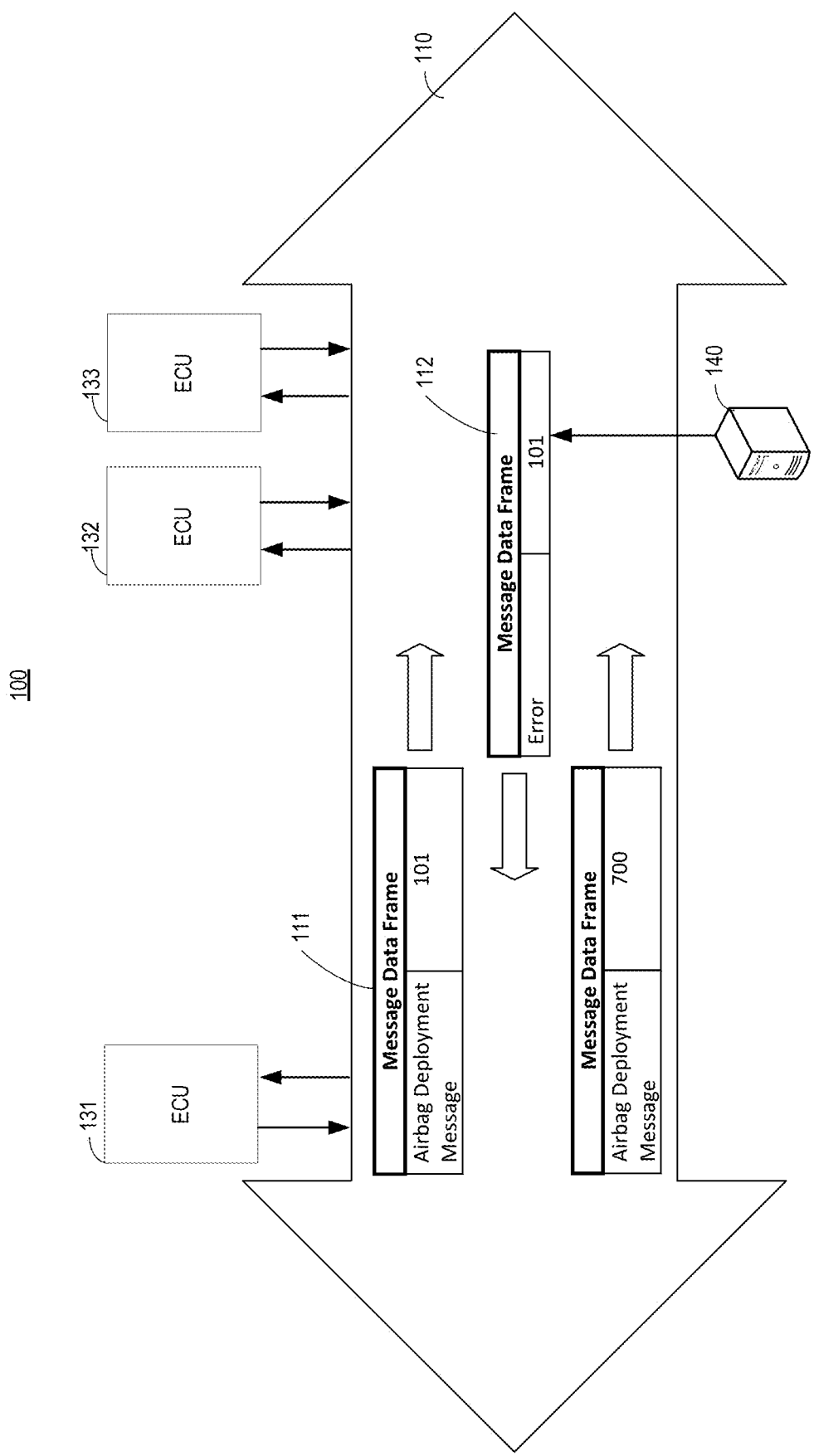
FIG. 2 shows an exemplary CAN bus system transmitting messages, according to one form of the present disclosure.

In FIG. 2, the first ECU 131 is shown to transmit a first message 111 into the CAN bus 110, where the first message is included within a message data frame. The first message 111 includes a message identifier (ID) having a value of 101. According to the exemplary message ID table shown below in Table 1, message ID value of 101 corresponds to an airbag deployment message. The message ID table in Table 1 also identifies messages relating to the vehicle's speed will have a message ID value of 100, and messages relating to the vehicle's brakes will have a message ID value of 102 according to an original message ID standard. This is the original message ID standard that may be publically known by even an outside intruder.

TABLE 1

| Data Field used for Feature | Original Identifier (ID for Message) |
|---|---|
| Speed | 100 |
| Airbag Deployment Message | 101 |
| Bake Paddle Status | 102 |

The second ECU 132 and the third ECU 133 are connected to the CAN bus 110 and are configured to both receive the first message 111 through the CAN bus 110. As the first message 111 includes a message ID value of 101, this indicates the intended recipient of the first message 111 is the second ECU 132 configured to receive messages relating to airbag deployment features. According to some forms, an outside intruder 140 may intercept the first message and corrupt the first message 111 before it reaches the second ECU 132 and/or the third ECU 133. In any case, the outside intruder 140 may be monitoring the CAN bus 110 for messages relating to a certain set of vehicle functions. For example, the outside intruder 140 may be looking for messages relating to high value vehicle features such as airbag deployment, speed, or brakes.

In any case, the outside intruder recognizes the first message 111 as belonging to airbag deployment features included in the set of predetermined vehicle functions based on the message ID having the known value of 101. Based on this determination, the outside intruder 140 interjects an error message 112 into the CAN bus 110 to be transmitted back to the first ECU 131. The error message 112 is artificially generated by the outside intruder 140, and is transmitted back to the first ECU 131 to represent the first message 111 was not successfully received by its intended recipient, the second ECU 132. So when the first ECU 131 receives the error message 112, the first ECU 131 determines that an error occurred during the transmission of the first message 111 such that the intended recipient, the second ECU 132, did not successfully receive the first message 111.

Therefore, based on this transmission error determination, the first ECU 131 will transmit the first message 111 onto the CAN bus 110 again in an attempt to ensure the second ECU 132 successfully receives the first message 111. However, under these circumstances if the message ID value of 101 in the first message 111 is not changed, each subsequent transmission of the first message 111 will continue to be recognized and intercepted by the outside intruder 140, and the outside intruder 140 will continue to transmit the error message 112 back to the first ECU 131 until the first ECU 131 reaches an internal error count. Once the internal error count is reached, the first ECU 131 may determine that there is something wrong with itself, and voluntarily shut down some, or all, of its controlled functionalities. Shutting down the first ECU 131 is an intended goal of the outside intruder 140.

Figure 3:
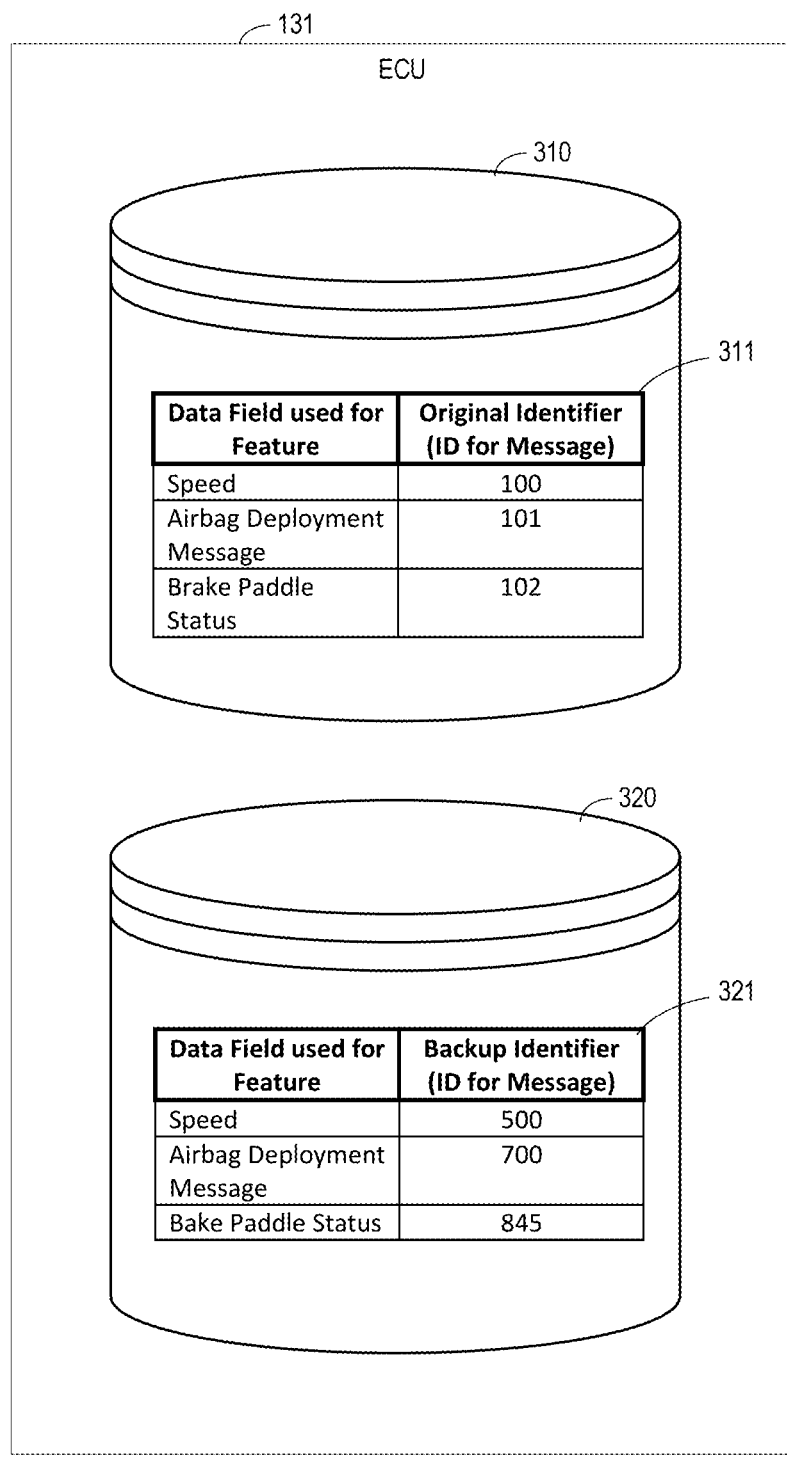
FIG. 3 shows an exemplary engine control unit including both an original message identifier database and a backup message identifier database, according to one form of the present disclosure.

To protect the CAN bus 110 from such instances of outside intruders 140, the present disclosure utilizes a backup message ID mapping strategy to update message IDs so that an outside intruder 140 no longer is able to detect targeted messages. To achieve this, each ECU 131-133 in the CAN bus system 100 includes both an original message ID database 310 and a backup message ID database 320, as shown in FIG. 3. In FIG. 3, the first ECU 131 is shown to include both the original message ID database 310 and the backup message ID database 320. A backup message ID value may be switched to replace the original message ID value, as described in further detail below.

The original message ID database 310 stores an original message ID table 311 that identifies a message ID value for messages relating to certain vehicle features. For example, the original message ID table 311 identifies a message ID of 100 for messages relating to the vehicle speed, a message ID of 101 for messages relating to the vehicle's airbag deployment, and a message ID of 102 for messages relating to the vehicle's brake system.

Also included in the first ECU 131 is the backup message ID database 320 that stores the backup message ID table 321 that identifies backup message ID values that may be switched out for the original message ID values. For example, according to the backup message ID table 321, for messages relating to the vehicle speed the first ECU 131 may switch out the original message ID value of 100 for the backup message ID value of 500, for messages relating to the vehicle's airbag deployment the first ECU 131 may switch out the original message ID value of 101 for the backup message ID value of 700, and for messages relating to the vehicle's brake system the first ECU 131 may switch out the original message ID value of 102 for the backup message ID value of 845. The message ID values and the backup message ID values provided with these exemplary forms are provided for exemplary purposes only, as other message ID values and backup message ID values may be used.

Figure 4:
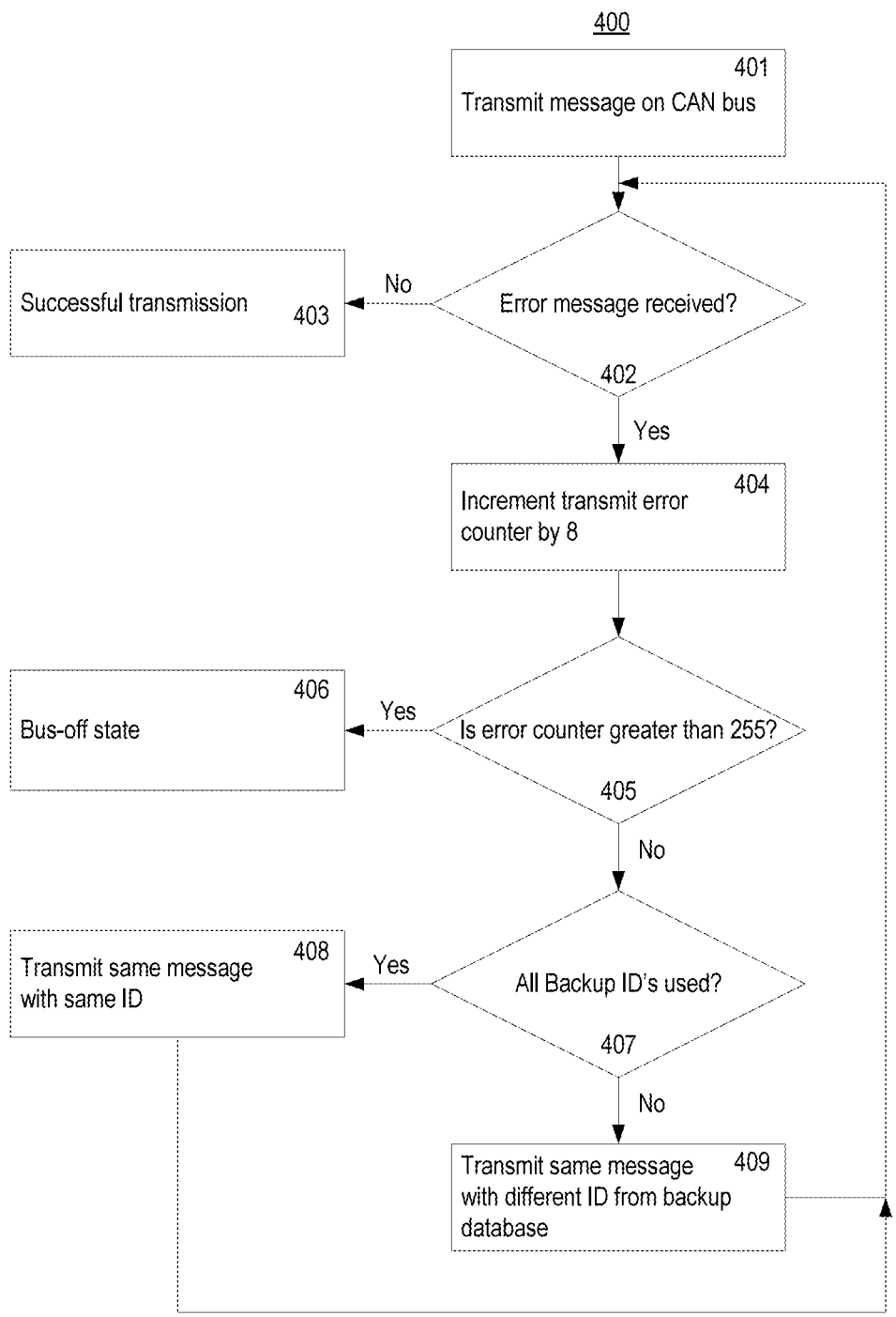
FIG. 4 shows an exemplary flow diagram describing a backup message identification strategy, according to one form of the present disclosure.

FIG. 4 illustrates an exemplary flow diagram 400 describing a process for implementing these enhanced security measures on the CAN bus system 100.

At 401, the first ECU 131 transmits a message on the CAN bus 110. For example, the transmitted message may be the first message 111 shown in FIG. 2 that relates to the airbag deployment features.

At 402, the CAN bus system 100 determines whether each of the ECUs 131-133 has received the transmitted first message 111, and/or whether the first ECU 131 has received an error message in response to the transmitted message. The error message may be the error message 112 shown in FIG. 2, or other error message generated within the CAN bus system 100 (e.g., generated by the second ECU 132 or the third ECU 133). When the CAN bus system 100 determines that the error message has not been received by the first ECU 131 in response to the transmitted message, at 403 the CAN bus system 100 determines that the transmission was successful and no intrusion is detected.

However if the CAN bus system 100 (e.g., the first ECU 131) determines that the error message has been received by the first ECU 131, at 404 an internal error counter is increased by a predetermined amount (e.g., increased by 8 as shown in the flow diagram 400).

At 405, the first ECU 131 determines whether the error counter has a value that is greater than a predetermined value (e.g., the predetermined value is 255 according to the flow diagram 400). When the first ECU 131 determines the error counter value is greater than the predetermined value, then at 406 the first ECU 131 will voluntarily enter into a bus-off state. The bus-off state may be a predetermined state (e.g., according to CAN specification) where the first ECU 131 stops sending and/or receiving any further messages along the CAN bus system 100.

When the first ECU 131 determines the error counter value is less than the predetermined value, then at 407 the first ECU 131 proceeds to access its backup message ID database 320 and the backup message ID table 321. When an available backup message ID is available, at 409 the first ECU 131 generates a subsequent message that switches out the original message ID with the backup message ID included in the backup message ID table 321. In some cases where the backup message ID table 321 indicates there are no more remaining backup message IDs available to use, then at 408 the first ECU 131 will transmit the same message again using the same original message ID.

So going forward after switching out the original message ID for the new backup message ID, each subsequent message for airbag deployment will be identified using the backup message ID that is known to only the ECUs 131-133 included in the CAN bus system 100 storing the same backup message ID database 320, and unknown to any outside intruders 140. This way, the ECUs 131-133 will still understand the intended recipients of new messages including the backup message IDs because each of the ECUs 131-133 will be able to access their own backup message ID database 320 that includes the new message ID mappings from the original message IDs to the new backup message IDs.

This secret ID mapping strategy described by flow diagram 400 may be re-implemented at predetermined cycles after a set amount of time has passed or a set number of messages with the new backup message ID have been transmitted and/or received. By re-implementing the backup message ID mapping strategy from time to time, the security may be increased in case an outside intruder ever discovers the current backup message ID mapping strategy. So as long as each of the ECUs 131-133 in the CAN bus system 100 includes the same backup message ID tables, each subsequent message using different backup message ID values may be transmitted and received by the ECUs 131-133, with the ECUs 131-133 understanding the new mapping of the backup message ID values by accessing their backup message ID tables in their backup message ID databases.

Figure 5:
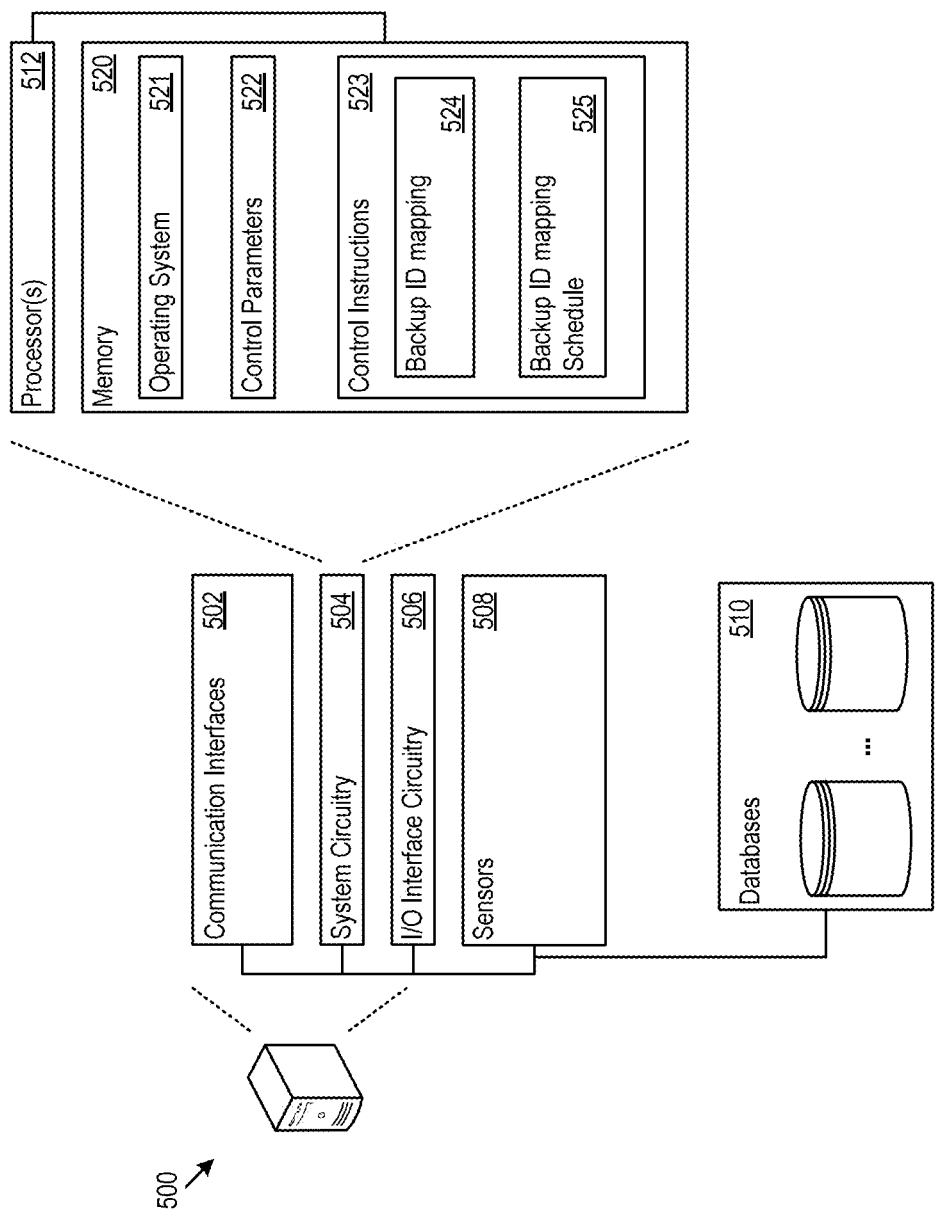
FIG. 5 shows an exemplary architecture for an engine control unit, according to one form of the present disclosure.

FIG. 5 illustrates an exemplary computer architecture of an ECU 500 that may be utilized for implementing the security measures described herein. The ECU 500 may, for example, be representative of the ECUs 131-133. The ECU 500 includes communication interfaces 502, system circuitry 504, input/output (I/O) interface circuitry 506, and sensors 508.

The I/O interface circuitry 506 may include touch sensitive displays, voice or facial recognition inputs, buttons, switches, speakers and other user interface elements for controlling access to the ECU 500. Additional examples of the I/O interface circuitry 506 includes microphones, video and still image cameras, headset and microphone input/output jacks, Universal Serial Bus (USB) connectors, memory card slots, and other types of inputs. The I/O interface circuitry 506 may further include magnetic or optical media interfaces (e.g., a CDROM or DVD drive), serial and parallel bus interfaces, and keyboard and mouse interfaces.

The communication interfaces 502 may be used for accessing a CAN bus to receive and/or transmit data between ECUs and/or other devices that are coupled to the CAN bus. For example, the communication interfaces 502 may include wireless and/or wired transmitters and receivers ("transceivers") and any antennas used by the transmit and receive circuitry of the transceivers. The transceivers and antennas may support WiFi network communications, for instance, under any version of IEEE 802.11, e.g., 802.11n or 802.11ac, or other wireless protocols such as Bluetooth, Wi-Fi, WLAN, cellular (4G, LTE/A, 5G). The communication interfaces 502 may also include serial interfaces, such as universal serial bus (USB), serial ATA, IEEE 1394, lighting port, $I^2C$, slimBus, or other serial interfaces for communicating on the CAN bus. The communication interfaces 502 may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol for communicating on the CAN bus.

The system circuitry 504 may include any combination of hardware, software, firmware, APIs, and/or other circuitry. The system circuitry 504 may be implemented, for example, with one or more systems on a chip (SoC), application specific integrated circuits (ASIC), microprocessors, discrete analog and digital circuits, and other circuitry. The system circuitry 504 may implement any desired functionality of the ECU 500. As just one example, the system circuitry 504 may include one or more processor 512 and memory 520.

The memory 520 stores, for example, control instructions 523 for executing the security measures, as well as an operating system 521. In one implementation, the processor 512 executes the control instructions 523 and the operating system 521 to carry out any desired functionality of the ECU 500, including those attributed to the secret ID mapping scheme 524 and the secret ID mapping schedule 525. The control parameters 522 provide and specify configuration and operating options for the control instructions 523, operating system 521, and other functionality of the ECU 500.

The ECU 500 may further include a plurality of databases 510 for storing the different backup message ID mapping tables. The ECU 500 also includes sensors 508. The sensors may include one or more sensors for detecting air flow, pressure, temperature, speed, engine characteristics, impact, acceleration pedal position, airbag status, oxygen levels, or other characteristics that may be measurable on a vehicle.

Various implementations have been specifically described. However, other implementations that include a fewer, or greater, number of features and/or components for each of the apparatuses, methods, or other forms described herein are also possible.

What is claimed is:

1. A computing device comprising:
   a message interface circuitry configured to:
      transmit a data message to a controller area network (CAN) bus, wherein the data message includes a message ID; and
      receive an error message from the CAN bus;
   a data storage unit configured to store a backup database, wherein the backup database includes a data table including a mapping of an original message identifier (ID) to a secret message identifier (ID);
   a processing circuitry configured to:
      detect the error message;
      increase an error counter based on the detected error message;
      retrieve a backup message ID table stored on the backup database;
      identify, from the backup message ID table, a backup message ID corresponding to the message ID; and
      transmit, through the message interface circuitry, an updated message on the CAN bus, wherein the updated message replaces the message ID with the backup message ID, and
   wherein the processing circuitry is further configured to:
      update the backup message ID table to change values of the backup message IDs when the error counter reaches a predetermined update value.

2. The computing device of claim 1, wherein the backup message ID table includes a plurality of predetermined backup message IDs each corresponding to a different feature.

3. The computing device of claim 1, wherein the computing device is an engine control unit.

4. The computing device of claim 1, wherein the processing circuitry is further configured to:
enter a bus-off state when the error counter is greater than a predetermined value.

5. The computing device of claim 1, wherein the processing circuitry is further configured to:
periodically update the backup message ID table to change values of the backup message IDs.

6. The computing device of claim 4, wherein the predetermined value is 255.

7. A method comprising:
transmitting, by a message interface circuitry, a data message to a controller area network (CAN) bus, wherein the data message includes a message ID;
receiving, by the message interface circuitry, an error message from the CAN bus;
detecting, by a processing circuitry, the error message;
increasing, by the processing circuitry, an error counter based on the detected error message;
retrieving, by the processing circuitry, a backup message ID table stored on a backup database;
identifying, by the processing circuitry, a backup message ID corresponding to the message ID from the backup message ID table;
transmitting, through the message interface circuitry, an updated message on the CAN bus, wherein the updated message replaces the message ID with the backup message ID; and
updating, by the processing circuitry, the backup message ID table to change values of the backup message IDs when the error counter reaches a predetermined update value.

8. The method of claim 7, wherein the backup message ID table includes a plurality of predetermined backup message IDs each corresponding to a different feature.

9. The method of claim 7, wherein the backup database is included in an engine control unit.

10. The method of claim 7, further comprising:
entering, by the processing circuitry, a bus-off state when the error counter is greater than a predetermined value.

11. The method of claim 7, further comprising:
periodically updating, by the processing circuitry, the backup message ID table to change values of the backup message IDs.

12. The method of claim 10, wherein the predetermined value is 255.

13. A computing device comprising:
a processing circuitry; and
a non-transitory storage medium configured to store instructions that, when executed, causes the processing circuitry to:
detect an error message;
increase an error counter based on the detected error message;
retrieve a backup message ID table stored on a backup database;
identify, from the backup message ID table, a backup message ID corresponding to the message ID; and
transmit, through a message interface circuitry, an updated message on a CAN bus, wherein the updated message replaces the message ID with the backup message ID, and
wherein the processing circuitry is further configured to:
update the backup message ID table to change values of the backup message IDs when the error counter reaches a predetermined update value.

14. The computing device of claim 13, wherein the computing device is an engine control unit.

15. The computing device of claim 13, wherein the non-transitory storage medium is further configured to store instructions that, when executed, causes the processing circuitry to:
enter a bus-off state when the error counter is greater than a predetermined value.

16. The computing device of claim 13, wherein the non-transitory storage medium is further configured to store instructions that, when executed, causes the processing circuitry to:
periodically update the backup message ID table to change values of the backup message IDs.

17. The computing device of claim 15, wherein the predetermined value is 255.

* * * * *